July 8, 1941.  J. W. SMITH  2,248,590
AERONAUTICAL PROPELLER BLADE MOUNTING
Filed Nov. 15, 1937  2 Sheets-Sheet 1
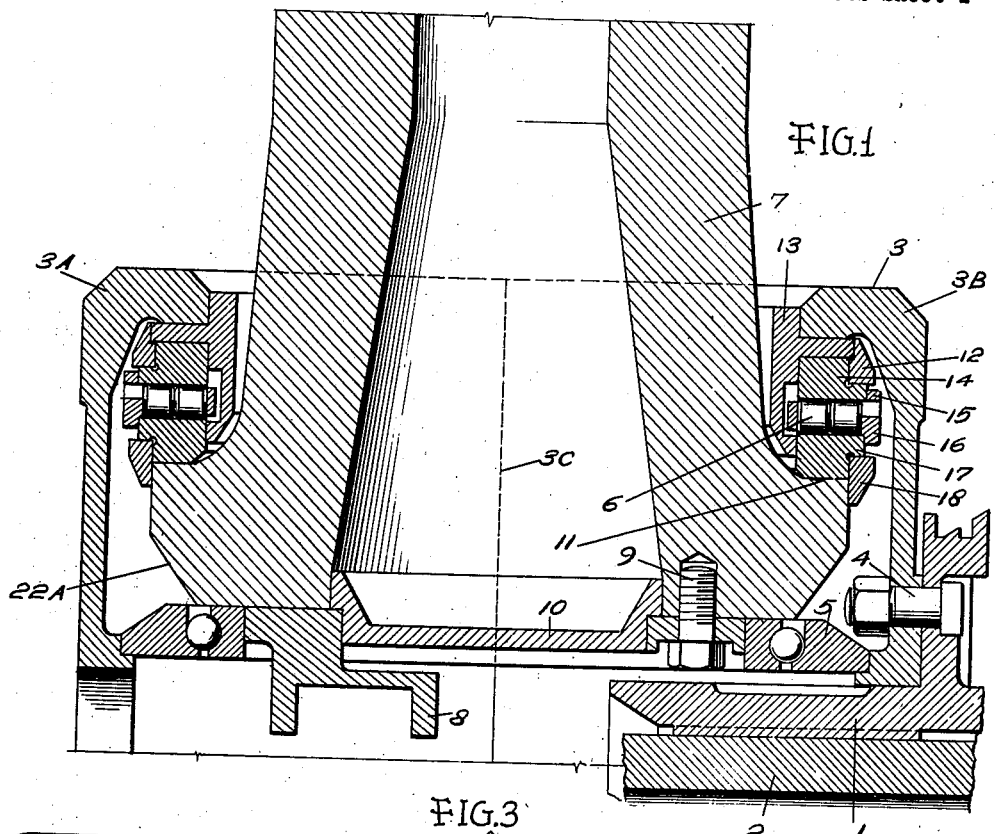
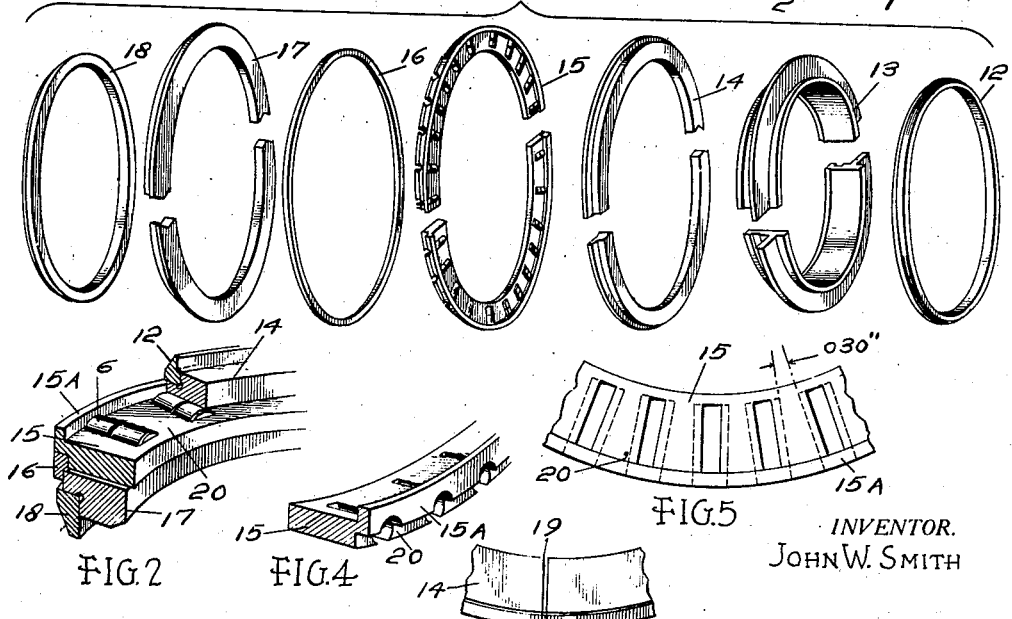
INVENTOR.
JOHN W. SMITH
BY
Herbert J. Fairbanks
ATTORNEY.

July 8, 1941.     J. W. SMITH     2,248,590
AERONAUTICAL PROPELLER BLADE MOUNTING
Filed Nov. 15, 1937     2 Sheets-Sheet 2

INVENTOR.
JOHN W. SMITH
BY Herbert S. Fairbanks
ATTORNEY.

Patented July 8, 1941

2,248,590

UNITED STATES PATENT OFFICE 2,248,590

AERONAUTICAL PROPELLER BLADE MOUNTING

John W. Smith, Philadelphia, Pa.

Application November 15, 1937, Serial No. 174,599

5 Claims. (Cl. 170—162)

This invention relates to aeronautical propeller blade mountings. The propeller is provided with a universal flange mounting with a thrust bearing seat for automatic selective pitch. It is also adapted for a fixed pitch hub mounting.

The hub and flange mounting are sufficiently large in diameter to provide for a thrust bearing load due to centrifugal force plus the cantilever load, thus employing a flanged shank as the only means for blade support for hubs provided with thrust bearings, or for hubs which grip the flange in fixed position.

An interchangeable blade mounting is very important for military and civilian use, and it is more important from the viewpoint of production. This universal flange mounting provides for a simple compact hub, which is considerably lighter than the type of hubs heretofore employed. The interchangeability depends on a novel form of thrust bearing, assembled in place by splitting the bearing rings, roller retainers and oil seal rings, and locking the split rings with heat treated locking rings.

The rings are locked in place without pinning, by centrifugal force.

Other novel features of construction and advantage will hereinafter more clearly appear in the detailed description and the appended claims.

For the purpose of illustrating the invention, I have shown in the accompanying drawings a typical embodiment of it, which, in practice, will give satisfactory and reliable results. It is, however, to be understood that the various instrumentalities of which my invention consists can be variously arranged and organized and my invention is not limited to the exact arrangement and organization of these instrumentalities as herein set forth.

Figure 1 is a sectional elevation of a propeller blade mounting embodying my invention.

Figure 2 is a sectioned, perspective view of a thrust bearing.

Figure 3 shows a perspective view of separated parts of the thrust bearing.

Figure 4 is a sectioned, perspective view of the roller retainer.

Figure 5 is a top plan view of Figure 4.

Figure 6 is a plan view showing more particularly the notching of the roller retainer before breaking.

Similar numerals of reference indicate corresponding parts.

Figure 7:
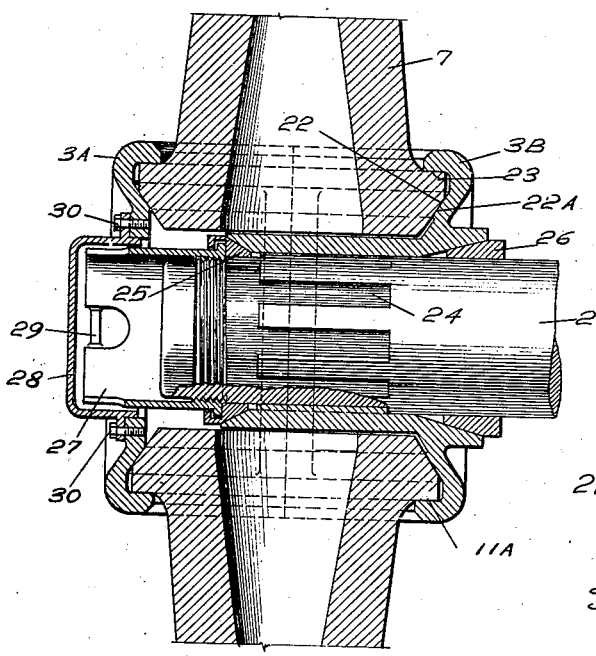
Figure 7 is a sectioned view of a propeller mounting for a fixed pitch hub.
Figure 11:
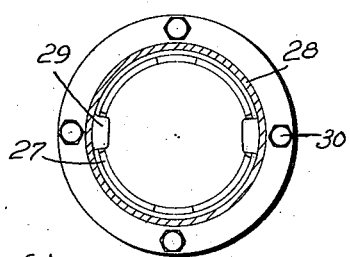
Figure 11 is a sectional view of Figure 7 on line 11—11.

Referring to the drawings:

The hub 1, in Figure 1, is mounted on the crank shaft 2, and is secured to a blade mounting 3 comprising two halves 3A and 3B, by fastening devices 4. 5 is a radial bearing which cooperates with a thrust bearing 6 to maintain propeller stability. 7 is the shank of an aluminum alloy propeller blade, the rotary movement of which is controlled by a bracket 8 secured to the shank by a fastening device 9, as will be understood by reference to my copending application Serial No. 168,227, for an automatic, pitch controlled hub. The open end of the tubular shank 7 is sealed by a plate 10.

The propeller blade shank has integral with it a thrust bearing seat 11, and to facilitate assembly of the blade shank on the thrust bearing seat the novel split thrust bearing 6 is employed.

The thrust bearing 6 comprises a locking ring 12, an oil seal ring 13, a bearing ring 14, a roller retainer 15, a locking ring 16, a bearing ring 17 and a locking ring 18, as will be understood from the exploded view seen in Figure 3. The locking ring 12 locks together the bearing ring 14 and the oil seal ring 13. The locking ring 16 locks roller retainer 15. The locking ring 18 locks the bearing ring 17 on the thrust bearing seat 11. In Figure 6, the notch in the roller retainer, before breaking the roller retainer, is shown at 19.

Rings 14 and 17 are notched before hardening as shown in Figure 6. They are heat treated to the required hardness, ground and finished. The rings are readily broken at the notch after finishing.

Heretofore, it has been customary to make the outer ring 15A detachable. In this invention, I provide a continuous integral ring 15A to join together the individual spacers between rollers, thereby eliminating dowel pins in the detachable ring to locate the roller spacers 20. This novel feature is very important in providing the required rigidity for a split retainer.

The bearing herein illustrated represents a shank flange of seven and three-eighths inches in diameter which provides for only .030 of an inch distance between rollers when using sixty-two rollers in each row, nine millimeters in diameter. In order to secure rigidity, thick spacers would be required, thus reducing the capacity of the bearing employing a smaller number of rollers. In Figure 5, which is not drawn to scale, I have indicated the spacers at .030 of an inch.

Figure 8:
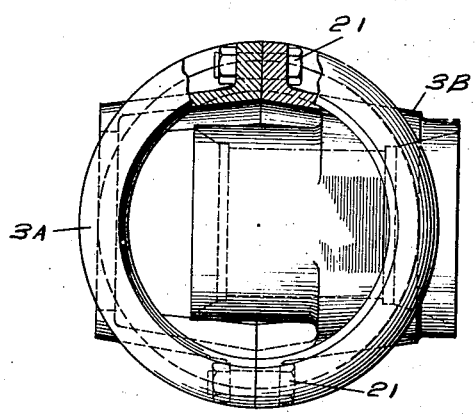
Figure 8 is a plan view partly in section of the hub mounting.

The blade mounting 3 is made in two halves as indicated by dotted line 3C, and bolted together in the same manner as that shown in Figure 8.

Figure 9:
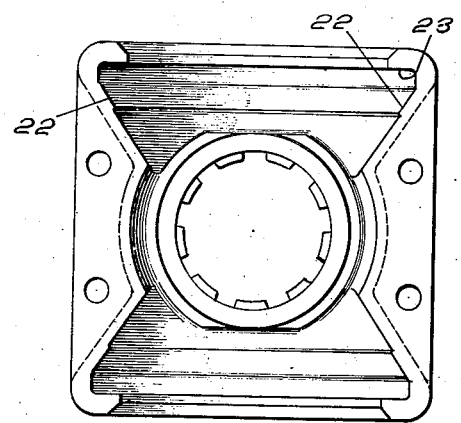
Figure 9 is an end elevation of the mounting.

In Figures 7, 8 and 9, the blade mounting is integral with the hub, and one half of the blade mounting 3A is clamped to the other half 3B by fastening devices 21. The angle 22 is predetermined to grip the wall 22A of the flange of the blade shank at a suitable tension to prevent rubbing, due to vibration, without imposing an excessive load on an annular seat 23, which carries the load due to centrifugal force.

The crank shaft 2 has a splined interlock at 24 with the hub, which latter is held in place by wedges 25 and 26 and nut 27. A cover plate 28 serves as a locking device for the nut 27 by means of a stud 29, and is held in place by bolts 30.

7A is the shank of a steel propeller blade which engages the hubs by means of thrust bearing seat 11A in the same manner as the aluminum alloy blade seen in Figures 1 and 7.

Figure 10:
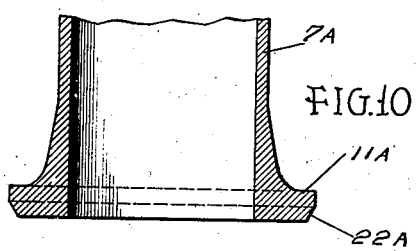
Figure 10 is a sectional view of the shank or hub end of a steel propeller blade.

The conical face 22A in Figures 1, 7 and 10 locates the blade in a radial direction and supplies the required amount of pressure on the thrust bearing to maintain stability when the centrifugal force load is less than the required load to maintain stability. The conical face 22A functions in an equivalent manner to the combination thrust and radial bearing 6 in Figure 1. Therefore, conical face 22A is employed when thrust bearing 6 is eliminated.

Having thus described my invention, what I claim as new and desire to secure by Letters Patent is:

1. A propeller blade mounting, comprising a split hub provided with an annular seat, a tubular shank having an annular seat, a split thrust bearing between said seats, an oil ring having a flange between the hub seat and the thrust bearing, means to secure the hub sections in assembled conditions, and a locking ring locking the oil seal ring and thrust bearing together.

2. A propeller blade mounting, comprising a split hub provided with an annular seat, a tubular shank having an annular seat, a split thrust bearing between said seats, an oil ring having a flange between the hub seat and the thrust bearing, means to secure the hub sections in assembled conditions, and a locking ring locking the thrust bearing to the annular seat of said tubular shank.

3. A propeller blade mounting, comprising a split hub provided with an annular seat, a tubular shank having an annular seat, a split thrust bearing between said seats, an oil ring having a flange between the hub seat and the thrust bearing, means to secure the hub sections in assembled conditions, a locking ring locking the oil seal ring and thrust bearing together, and a locking ring locking the thrust bearing to the annular seat of said tubular shank.

4. A propeller blade mounting comprising a hub having an annular seat, a tubular shank having a thrust bearing seat, a split thrust bearing between said seats having split bearing rings and roller retaining ring with an integral flange to position a bearing ring, a split oil seal ring, a locking ring locking together a bearing ring and the oil seal ring, a locking ring locking a bearing ring on the thrust bearing seat, and a locking ring locking the roller retaining ring and its rollers.

5. A propeller blade mounting, comprising a split hub having an annular seat, a tubular propeller blade shank having an integral external flange, a roller thrust bearing cooperating with said seat and flange, having split races, and having a split roller retainer, one of said races being mounted on said propeller blade flange, a locking ring retaining said last mentioned race in assembled position on said flange, a locking ring retaining assembled the split race adjacent the annular seat in the split hub, and a locking ring locking the roller retaining ring and its rollers.

JOHN W. SMITH.